United States Patent Office 3,529,665
Patented Sept. 22, 1970

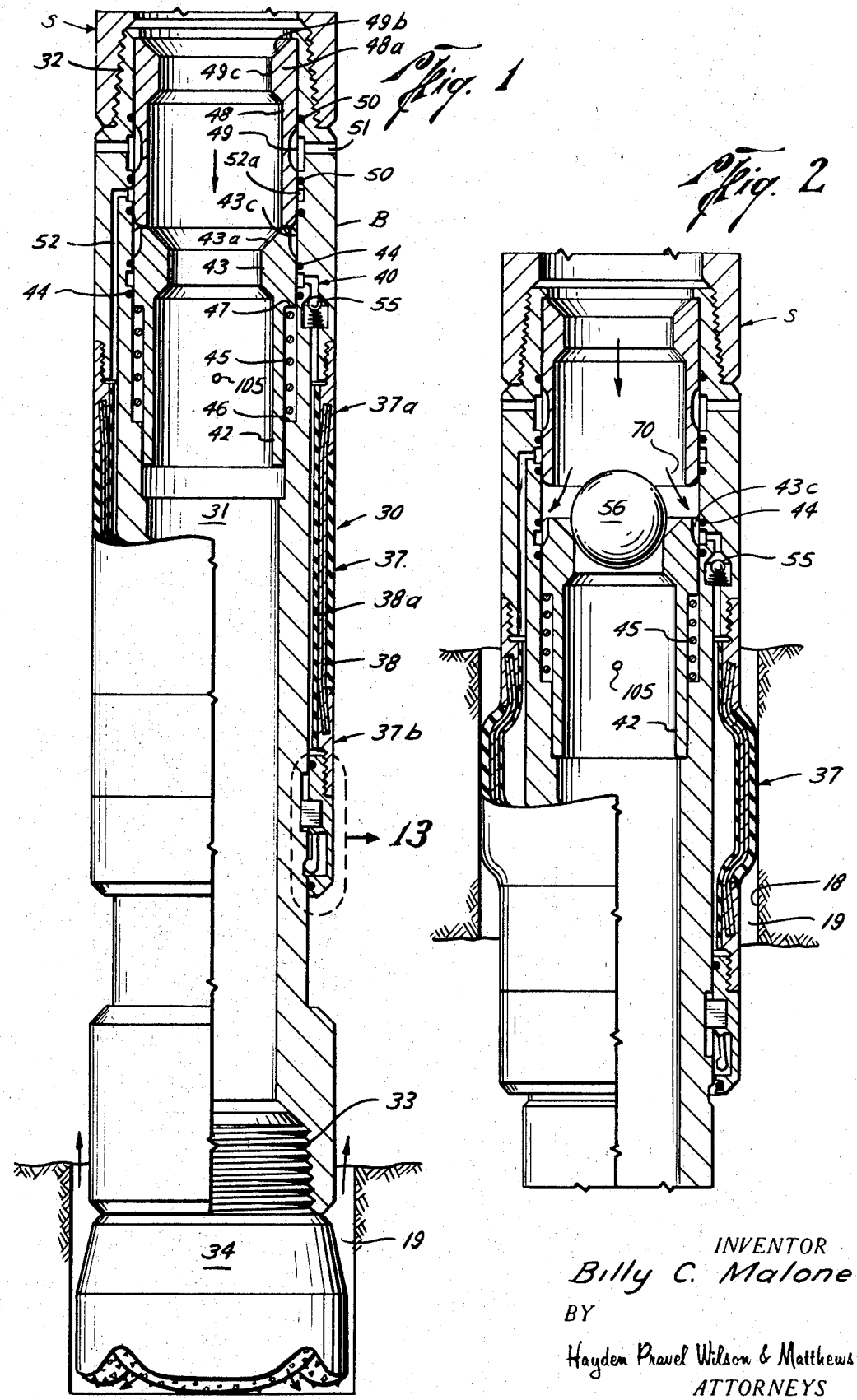

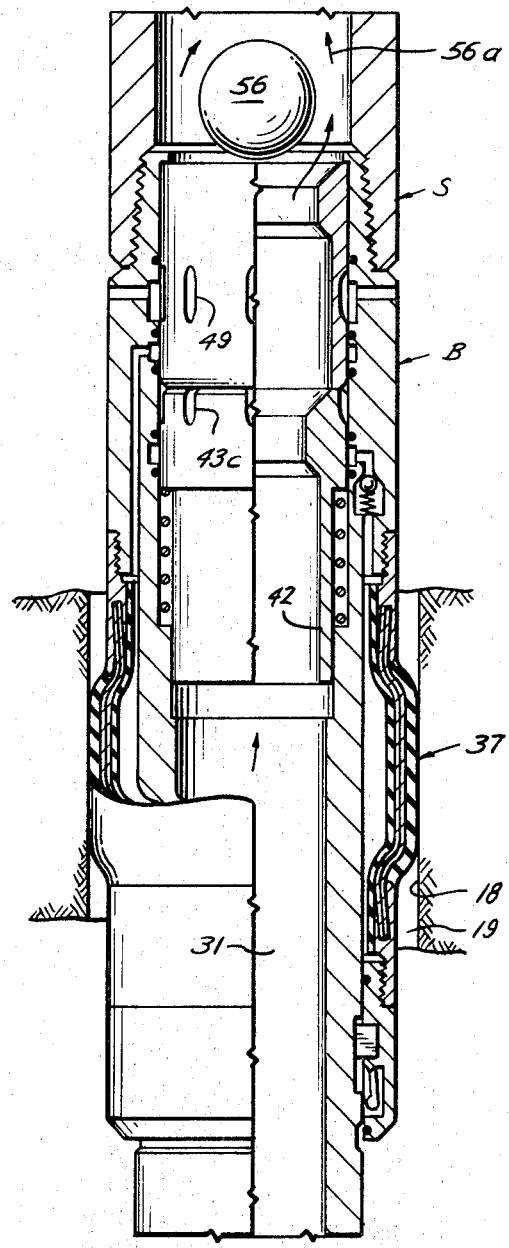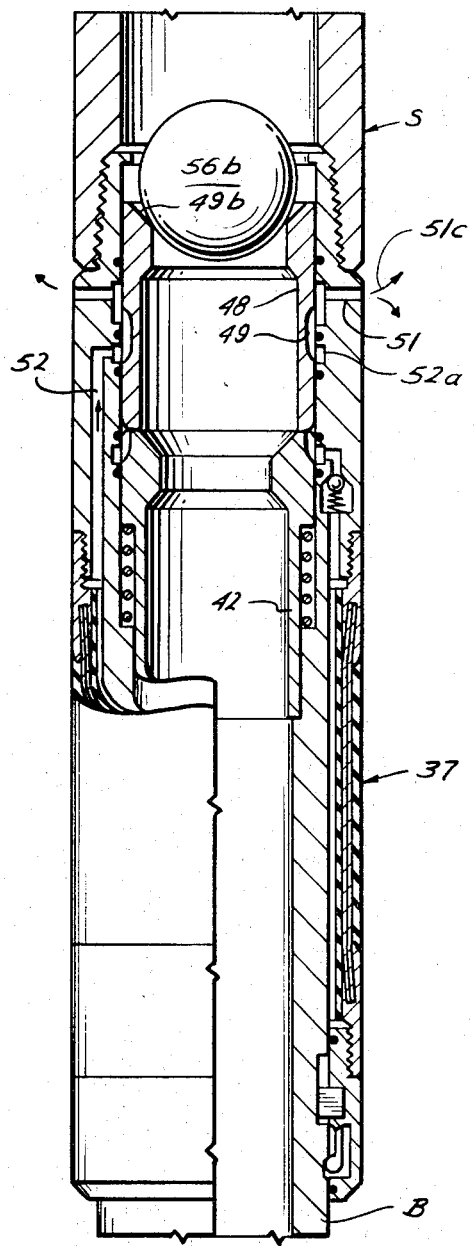

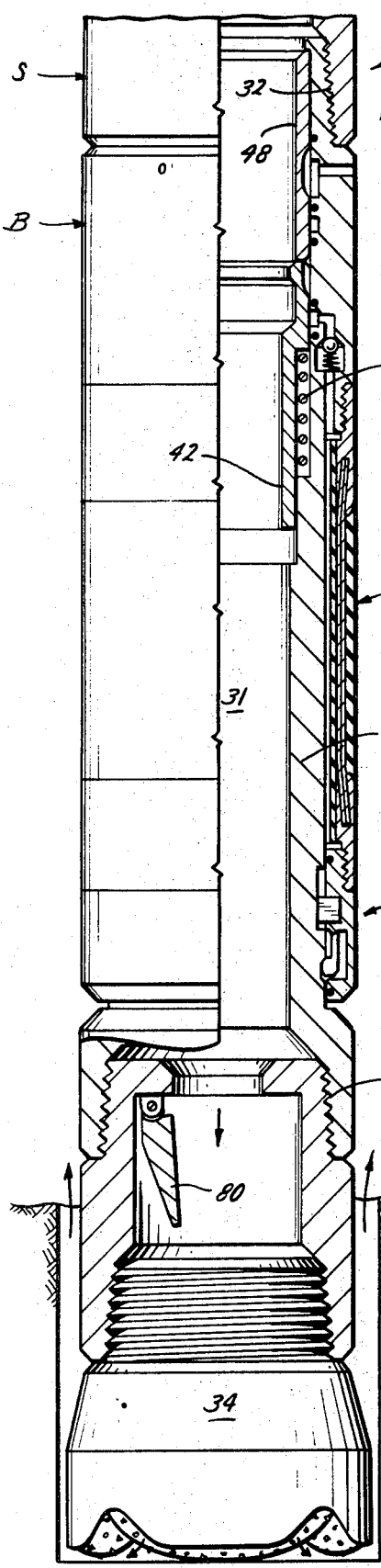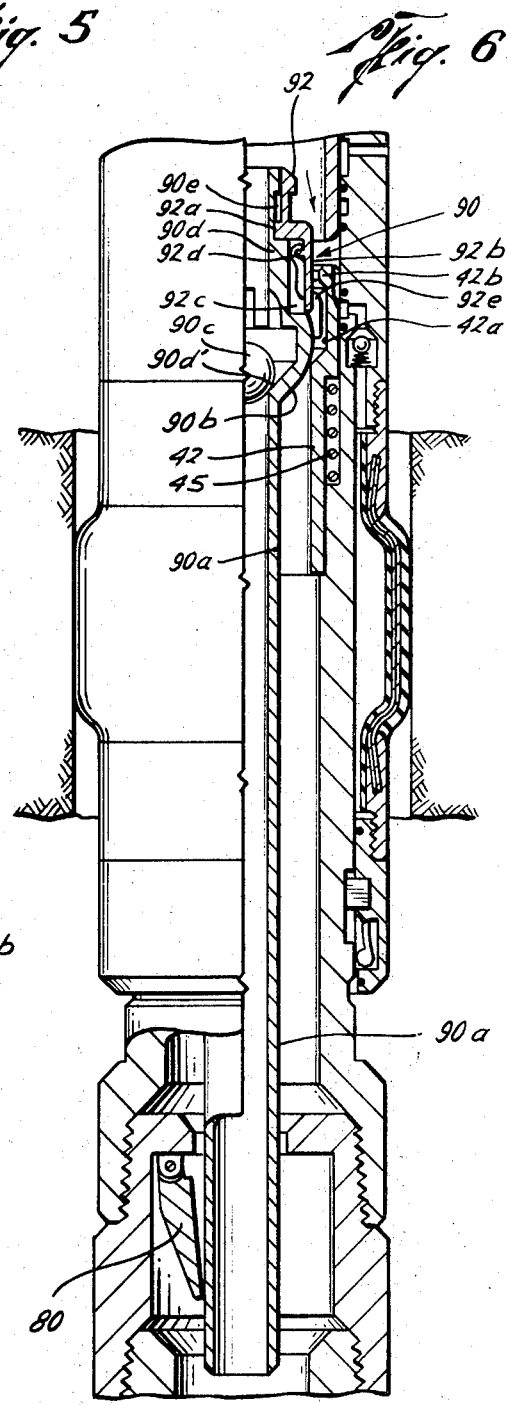

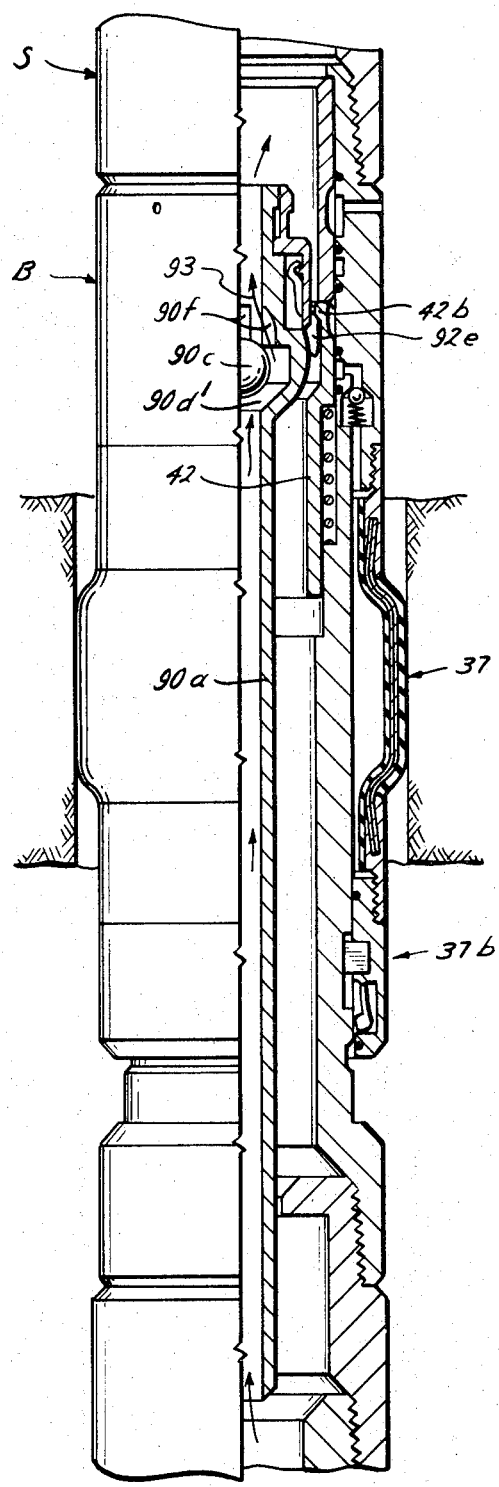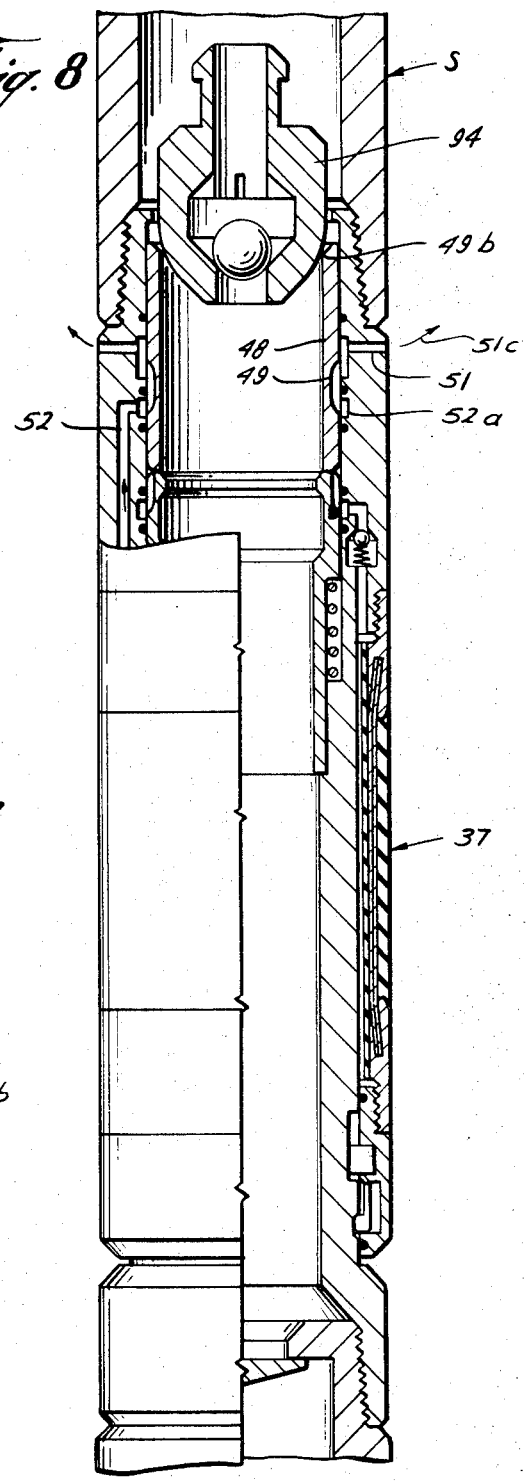

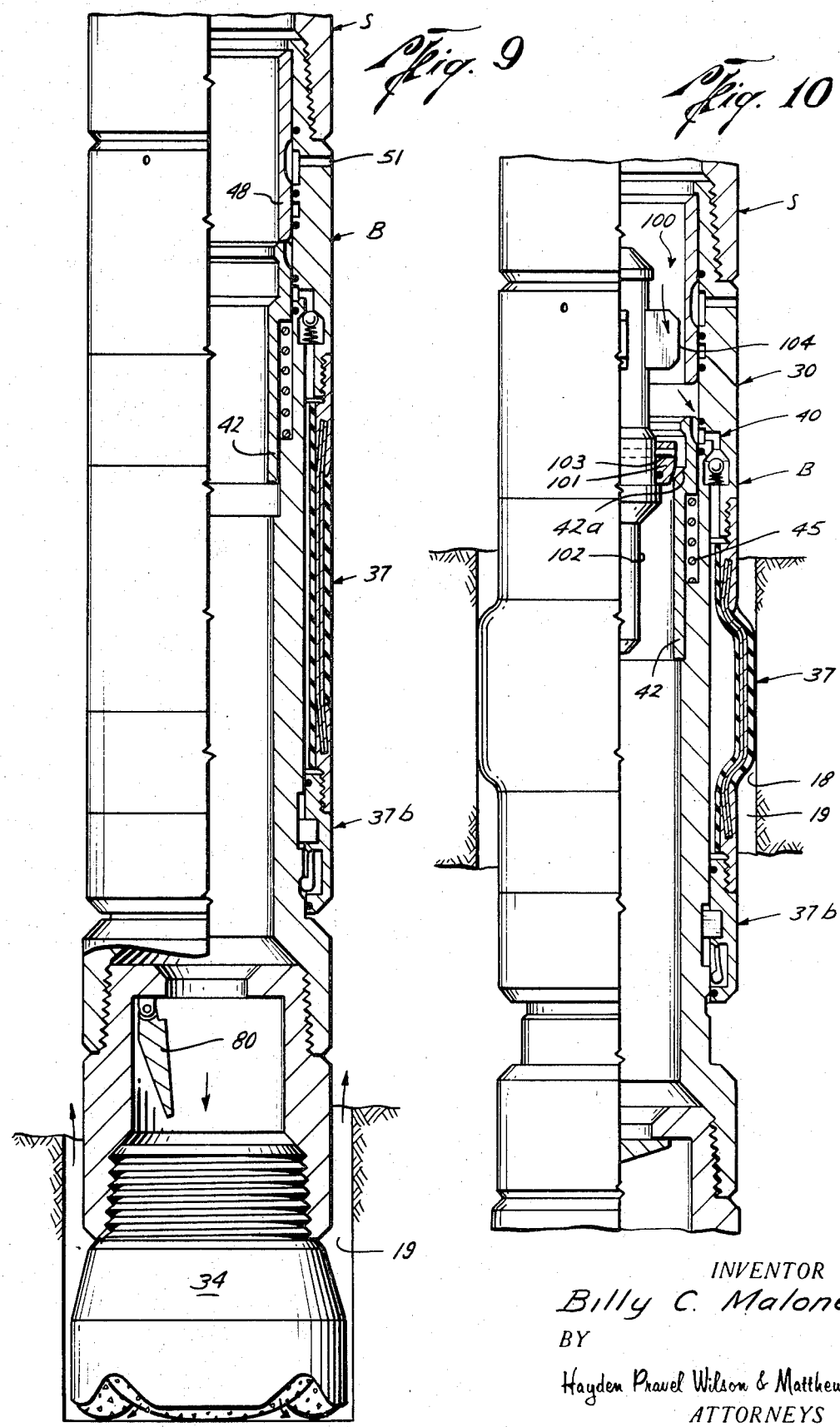

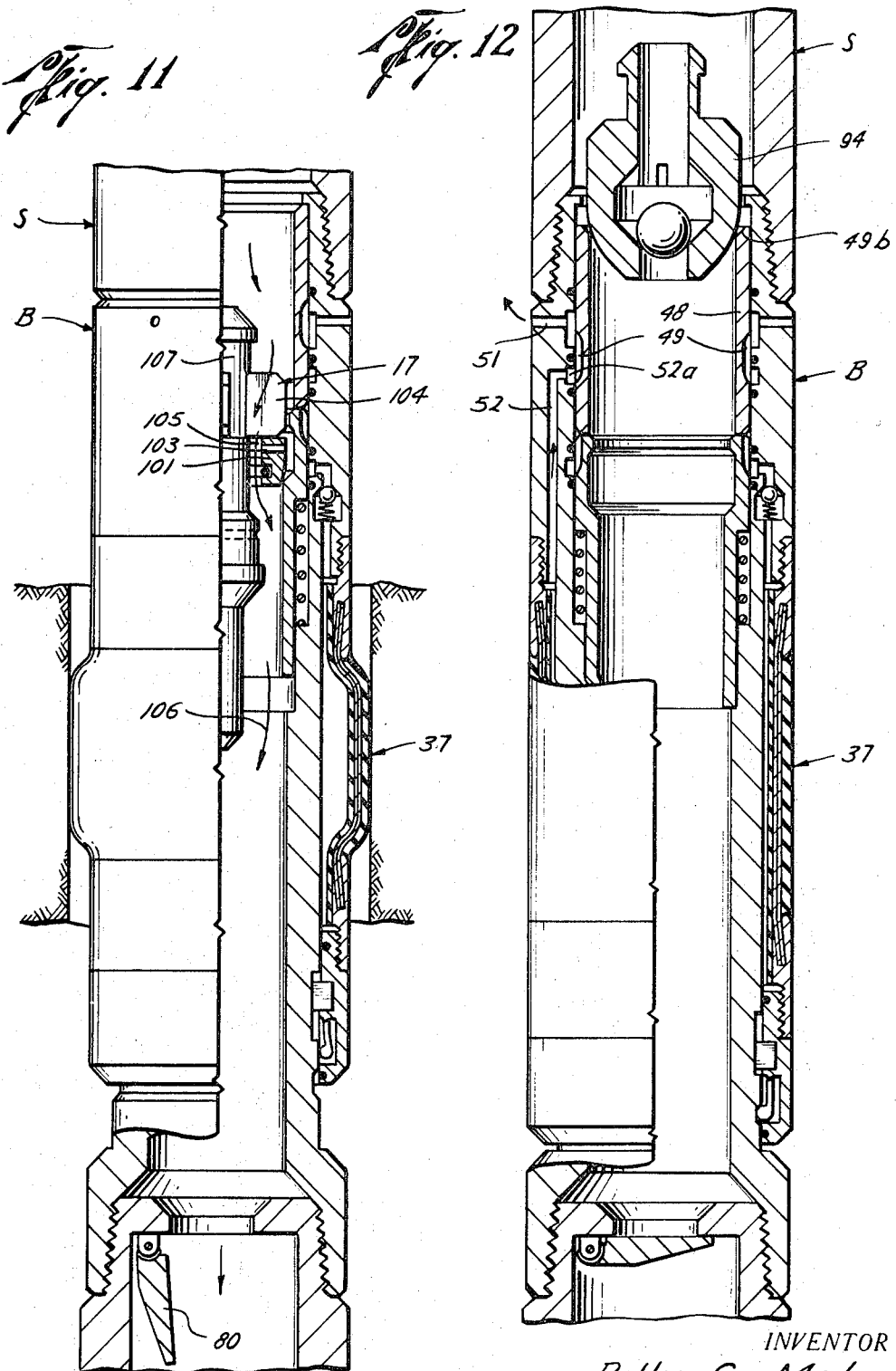

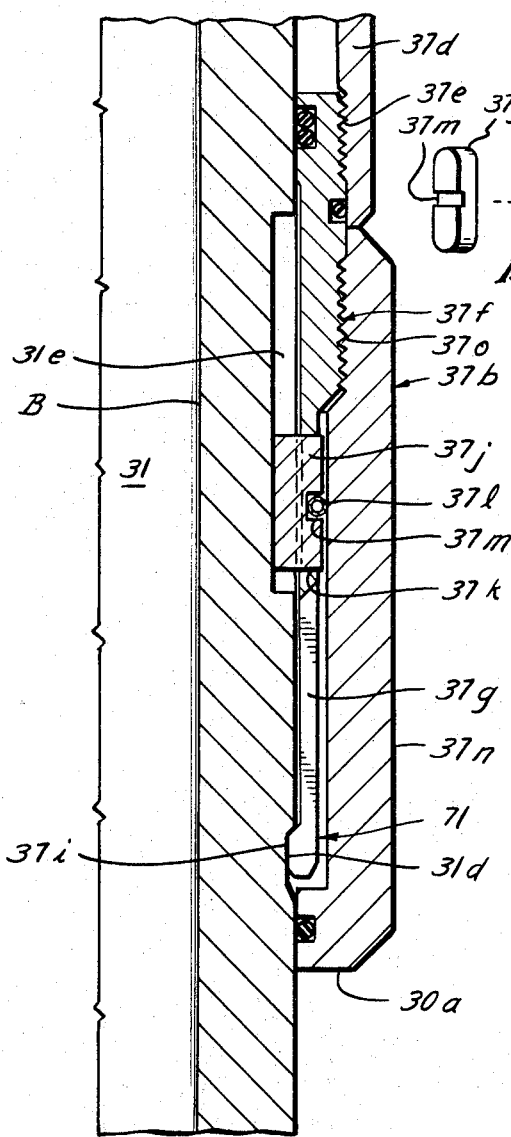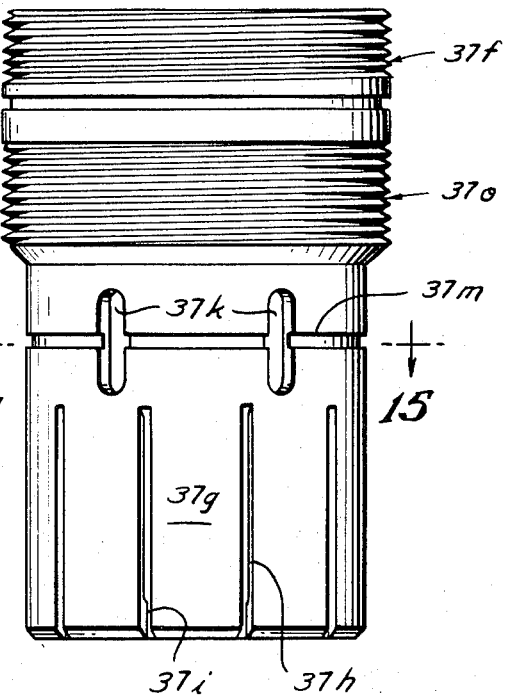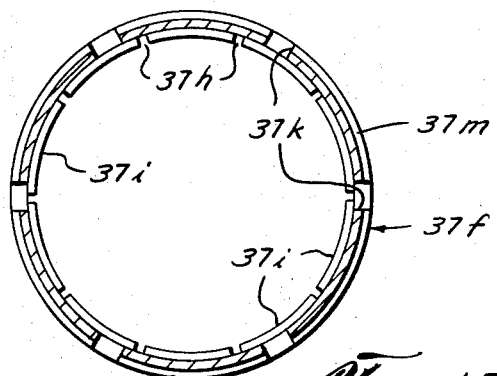

3,529,665
METHOD OF TESTING, TREATING AND ISOLATING FORMATIONS DURING DRILLING
Billy C. Malone, Houston, Tex., assignor to Lynes, Inc., a corporation of Texas
Filed Dec. 13, 1968, Ser. No. 790,501
Int. Cl. E21b 33/12, 47/00
U.S. Cl. 166—264                             32 Claims

ABSTRACT OF THE DISCLOSURE

A method of using a well tool incorporating a reinforced inflatable element which is carried by the drill string in the well bore and remains deflated during rotary drilling operations, which can be inflated to seal off the well bore to enable various operations to be performed in the well bore and the element thereafter deflated and rotary drilling operations resumed. This operation may be repeated as often as desired.

BACKGROUND OF THE INVENTION

Field of the invention

The field of the present invention relates to a method of using tools incorporating a reinforced inflatable element for running as an integral part of a rotary drill string for a well bore, mine shaft, opening in a conduit to be drilled out, or in other environments. The reinforced inflatable element is mounted so as to remain deflated, and it may be inflated when desired to seal off with a surrounding wall to enable various operations to be performed in the well opening therebelow. For example, during well bore drilling operations it may be desired to test a particular formation encountered and the present invention permits this. It also relates to the problem of treating blowouts by pumping material down the drill string into the blowout zone after inflation of the element, or permitting the blowout zone to dissipate itself. The device could also be used to pump lost circulation material into a serious thief zone, and can be used to cement or otherwise isolate zones or formations.

It relates to the field which enables other operations to be also performed and then the element can be deflated and desired drilling operations resumed.

Description of the prior art

Applicant is familiar with the patent to J. H. Hughes No. 2,862,562; the patent to M. E. True No. 2,978,046; the patent to R. H. Blood et al. No. 2,942,667; two patents issued to A Boynton No. 2,229,635 and No. 2,301,190; the patent to A. Barry et al. No. 3,134,441; the patent to L. H. Robinson, Jr., et al. No. 3,373,820; and the patent to G. A. Humason No. 2,633,200.

All of these devices relate to various types of drill stem testing tools or various types of arrangements of inflatable elements on rotary drill strings, particularly for use in well bores. However, all of them are disadvantages in that they incorporate mechanisms within the drill string, which may interfere with the drilling operations or with other operations which are to be performed within the well bore, or other opening. Additionally, some of the above patents do not provide an arrangement wherein the reinforced inflatable element is latched, or locked, in position on the drill string in deflated position to inhibit its being torn up during normal rotary drilling operations, but which can be unlocked at one end to permit one end of the element to be moved longitudinally relative to the drill string to inflate it and seal it with the well bore wall, or other opening.

So far as is known to the applicant, none of the prior art devices has ever proven to be useful to the extent that it has been commercially successful.

SUMMARY OF THE INVENTION

The present invention provides a method of using a body having a longitudinal bore therethrough, which is provided with means to secure it in a drill string and become an integral part thereof. The body carries a reinforced inflatable element which is secured at one end to the body and at its other end it is releasably locked to the body so that during normal rotary drilling operations in any type opening the element will remain deflated, thus reducing the possibility of damage to the element as the drill string is rotated or otherwise moved in the opening. A valve and passage means arrangement in the body cooperate to aid in inflating and deflating the element whereby operations as will be discussed hereinafter may then be carried out within the well bore or other opening without removing the drill string from the well bore or opening, and thereafter the valve and passage means arrangement enables the element to be deflated and normal rotary drilling or cutting operations continued.

All of the methods of this invention can be accomplished with a minimum of effort, and without removing the drill string from the well bore or other opening.

By maintaining the inflatable element locked at both ends on the body, one of which locking arrangements is releasable to enable one end to move longitudinally relative to the body so that the element can be inflated when desired, damage or destruction of the inflatable element is substantially reduced, if not completely eliminated when the drill string on which it is carried is rotated or otherwise moved in an opening; however, by incorporating the releasing mechanism for one end of the inflatable element, said inflatable element can be deflated and relatched on the body and rotary drilling or cutting operations resumed until it is desired to perform some other operations within the well bore which require inflating the element to seal off the well bore or other opening. The spring latch arrangement also includes means to prevent relative rotation between the body and the movable element end, while accommodating longitudinal movement between the body and the movable element end.

BRIEF DESCRIPTION OF THE DRAWINGS

FIG. 1 is a sectional view of a drill string in a well bore with a well tool suitable for accomplishing the results of the present invention and showing a drill bit at the lower end thereof in elevation;

FIG. 2 is a sectional view showing the element on the tool of FIG. 1 inflated to seal against the wall of a surrounding opening;

FIG. 3 is a sectional view, partly in elevation of a tool shown in FIGS. 1 and 2 and the relative position of the components when practicing the testing method of the present invention;

FIG. 4 is a sectional view partly in elevation, showing the relationship of the components of a tool when the inflatable element is being deflated;

FIG. 5 is a sectional view somewhat similar to FIG. 1, but shows a one way check valve means immediately above the drill bit;

FIG. 6 is a sectional view showing a tool with a form of closure means for first enabling the inflatable element to receive inflating fluid and thereafter a means for taking a sample from the well bore being drilled;

FIG. 7 is a sectional view and illustrates the flow of fluid during a test when the closure means of FIG. 6 is employed;

FIG. 8 shows the relationship of the components when the element is being deflated after the tool has been employed as shown in FIGS. 5, 6 and 7;

FIG. 9 is a sectional view partly in elevation, similar to FIG. 5;

FIG. 10 shows another form of closure means for use in connection with the method of the present invention and illustrates it in seated position in the tool with pressure applied in the drill string to actuate the valve means for inflation of the inflatable element;

FIG. 11 shows the closure means of FIG. 10 actuated so that fluid or material may be pumped down the drill string and into the well bore beneath the inflated element;

FIG. 12 is a sectional view similar to FIG. 8, showing the relationship of the components when the element is being deflated;

FIG. 13 is an enlarged sectional view showing an arrangement for accommodating relative longitudinal movement between one end of the reinforced inflatable element and the body of the tool, as well as a form of spring means to prevent premature movement or wadding of the inflatable element as the drill string rotates, such figure being an enlargement of the means which is circled in FIG. 1 and identified by FIG. 13;

FIG. 14 is an elevation of a part of the spring means as well as showing an exploded view of the lug means which is carried between one end of the reinforced inflatable element housing. The lug means which fits within keyways formed in the housing, accommodates relative longitudinal movement therebetween while preventing a relative rotational movement therebetween; and FIG. 15 is a sectional view on the line 14—14 of FIG. 14 illustrating further details of the means which accommodates relative longitudinal movement between one end of the packer, or element, and the housing while preventing a relative rotation therebetween.

DESCRIPTION OF THE PREFERRED EMBODIMENTS

Attention is first directed to FIG. 1 of the drawings, wherein a tool for practicing the method of the present invention is referred to generally by the numeral 30. It is shown as including a housing, or body B, which is provided with an internal bore 31, extending longitudinally therethrough. The body B is provided with threads as illustrated at 32 and 33 for connection in a drill string represented by the letter S so that it becomes an integral part of the drill string.

As shown in FIG. 1, the drill string S, as shown and described herein, is formed of a plurality of joints which are threadedly connected in end to end relation to form a drill string of suitable length; however, it can be appreciated that the drill string S may be formed of a continuous length of tubular member and the tool 30 incorporated therein by suitable means.

It will also be noted that, as shown in FIG. 1 of the drawings, the tool 30 is positioned immediately above the earth cutting member, such as a drill bit 34 which can be of any suitable form; however, the invention may be positioned in or above a string of drill collars which may be used in the drilling operations.

The body B supports and carries a reinforced inflatable element referred to generally by the number 37, the reinforcing being diagrammatically represented at 38 and comprises an annular sheath which is suitably impregnated with an elastomeric compound that is yieldable when the inflatable element 37 is inflated as will be described hereinafter. Even when in a fully expanded or inflated position, the annular sheath of reinforcing 38 completely surrounds the inner portion 38a of the element 37 and provides reinforcing.

The upper end 37a of the reinforcing inflatable element is secured to the body B while the lower end thereof represented generally by the number 37b is arranged so that it may move longitudinally relative to the body B to accommodate radial expansion of the reinforced inflatable element 37, and the element 37 is also mounted on the body B to prevent relative rotational movement therebetween, so that it will remain in a deflated position during normal drilling operations. It should be noted that the lower end of 37b of the inflatable element 37 is arranged on the body B so that it is initially latched or locked in position thereon to prevent premature or undesired longitudinal movement of the end of the packer during normal drilling operations. The latch, or lock means must be first actuated to release the end of 37b of the element relative to the body B so that relative longitudinal movement therebetween may occur.

I will be noted that passage means represented generally by the numeral 40, is provided in the body B which communicates with the bore 31 and the interior of the element to conduct inflating fluid thereto when it is desired to inflate the inflatable element 37.

Valve means, such as the sleeve 42, is mounted within the bore 31 and is supported so that the outer surface of the sleeve adjacent its enlarged end 43 spans the opening of the passage means 40 in the bore 31 which, in cooperation with the seal means 44, on each side of the opening of the passage means 40 in the bore 31, normally seals off the passage means 40 from bore 31 during drilling operations. Spring means 45, which rests on the shoulder 46 of the counterbore formed within the bore 31, abuts the shoulder 37 formed on the lower end of the enlarged end of 43 of the sleeve 42, and retains the sleeve 42 within the position just described.

A second, or additional valve means, such as sleeve means 48, is provided within the bore 31 above the sleeve 42, and it is provided with a plurality of longitudinally extending, circumferentially spaced recesses 49 in the outer periphery thereof. Suitable seals, as shown at 50, are provided adjacent each end of the recesses 49 between the body B and the sleeve 48, the seals 50 also being arranged on each side of the port means 51 formed in the body B to communicate with the well bore. The inner end of the port means terminates in the annular groove in the body B as shown in the drawings.

Additional passage means 52 is provided in the body B, which communicate with the interior of the inflatable element 37 and terminates at one end in the annular groove 52a formed in the wall of the bore 31. Communication between the port means 51 as well as the groove 52a is normally closed off by the seals 50 and outer surface of the sleeve 48 during rotary drilling operations.

In the form shown in FIGS. 1 through 4 inclusive, the sleeve 48 is provided with an enlarged end 48a, forming a seat 49b on the upper end thereof, and similarly the sleeve 42 is provided with a seat 43a on the upper end of the enlarged portion 43 of the sleeve 42 for a purpose as will be described.

If desired, one way operating spring loaded check valve means as shown at 55, may be provided in the passage means 40 to aid in retaining or locking the fluid in the inflatable element 37 after it has been inflated.

It should also be noted that the outer periphery of the enlarged portion of the sleeve 42 is provided with longitudinally extending, circumferentially spaced recesses 43c, for a purpose as will be described shortly.

In rotary drilling operations, a drilling fluid is employed for conveying cuttings to the surface and for other reasons. This fluid may be air, gas or liquid and sometimes, in rotary drilling operations, a formation may be damaged by the drilling fluid invading the formation and what might otherwise be a productive formation, might be indicated as being non-productive.

One advantage of the present invention is that immediately upon the penetration of a prospective zone or formation, it can be tested prior to damage thereto by the drilling fluid that might otherwise give a false indication.

In order to inflate the element, suitable closure means may be dropped down the drill string and in the form of the invention described in FIGS. 1 through 4 inclusive, the closure means is shown as being in the form of a ball 56 which is of a suitable diameter to pass through the opening 49c of the sleeve 48 and seat on the seat 43a of the sleeve 42 as shown in FIG. 2 of the drawings.

When the fluid pressure is increased in the drill string, the spring means 45 is depressed as shown in FIG. 2 of the drawings, whereupon fluid may be conducted as represented by the arrows as shown at 70 through the recesses 43c, and around the upper seal means 44 adjacent the opening of the passage means 40 which communicates with the bore 31 and thereupon be conducted to the interior of the inflatable element 37 to expand it and sealingly engage it with the wall 18 of the well bore 19.

As previously mentioned, the lower end 37b of the reinforced inflatable element 37 and the body B are constructed and arranged so that cooperating latch, or lock means are provided to retain the inflatable element in deflated position during normal drilling operations. Attention is now directed to FIGS. 13, 14 and 15, which illustrate details of one form of the cooperating lock means formed on the lower end of the reinforced inflatable element heretofore referred to by the numeral 37b, and the portion of the body B adjacent thereto. The latch means also incorporates a spring means referred to generally by the numeral 71. A skirt 37d is connected to, and extends downwardly from the reinforced inflatable element 37 (not shown), and is internally threaded as illustrated at 37e. Threadedly engaged with the threads 37e is the collar 37f, the lower end of which forms the spring fingers 37l. The spring fingers 37g are provided in the collar 37f by forming longitudinally extending and radially spaced slots 37h therein, and providing an enlargement 37i which fits within the annular recess 31d formed on the surrounding housing. This arrangement provides a latch, or lock means incorporating spring means between the lower end 37b of the reinforced inflatable element 37 and the body B until a predetermined amount of pressure is exerted to spring the fingers 37g out of the annular recess 31d to enable the reinforced inflatable element 37 to radially expand and seal with the wall of the surrounding opening.

Additional means are provided to accommodate relative longitudinal movement of the lower end 37b of the inflatable element 37 and the body B, while preventing relative rotation between the body B and lower end 37b of the element, such means being shown as lugs 37j which are received within the openings 37k formed in the collar 37f. A plurality of longitudinally extending keyways 31e are provided at circumferentially spaced intervals within the body B within which the lugs 37j slide and the lugs 37j move upwardly as the inflatable element 37 radially expands. It can be appreciated that since the skirt 37d is connected to the collar 37f, and that the lugs are, in turn, carried in the openings 37k of the collar 37f, when the inflatable element radially expands, the lugs 37j move upwardly.

In assembling the skirt 37d, collar 37f and lugs 37j, the collar 37f and skirt 37d will be threadedly engaged by means of threads 37e. Thereafter, slight relative rotation of the collar 37f can be effected so as to align at least several of the openings 37k with the keyways 31e in the body B to enable the lugs 37j to be dropped therein. Thereafter, suitable spring means as illustrated at 37l can be positioned in the recess 37m formed in the collar and in the lugs to aid in retaining them in position.

Thereafter, the retaining collar 37n can be threadedly secured by means of the threads 37o on the collar 37f. Suitable seals are provided as illustrated to prevent leakage of fluid from the element 37.

From the foregoing description, it can be appreciated that this latch arrangement enables the lower end 37b of the reinforced inflatable element 37 and the body B to move relative to each other longitudinally while preventing relative rotation. Similarly, the arrangement of the projections 37i and cooperating recess 31d prevent premature actuation or radial movement of the reinforcing inflatable element 37, should the lower radially projecting portion of the tool 30a strike a ledge or some other projection which might tend to wad the lower end of the inflatable element 37. A similar latch arrangement as described with regards to FIGS. 13, 14 and 15 is employed in each form of the invention described herein.

After the inflatable element 37 has been set as shown in FIG. 2 of the drawings, the desired formation may be tested by permitting it to flow upwardly through the drill bit 34 through the bore 31 of the body B and up around the closure ball means 56 as represented by the arrows 56a. As will be seen in FIG. 3, the sleeve 42 has reassumed its original position as illustrated in FIG. 1 of the drawings, and after the test of the desired formation has been completed, it is then desirable to unset the inflatable element 37 and continue normal rotary drilling operations. This permits the test to be accomplished without removing the drill string from the well bore and conducting a conventional test by some other means well known in the art.

In order to unset the inflatable element 37, from engagement with the well bore wall 18 as shown in FIG. 3, an additional closure means as represented at 56b is lowered through the drill string to rest on the seat 49b whereupon suitable pressuring within the drill string moves the sleeve 48 downwardly whereupon the inflating fluid within the inflatable element 37 is conducted through the passage 52 and to the annular groove 52a which is now in communication with the recesses 49 on the outer periphery of sleeve 48. The recesses 49 communicate the groove 52a with the annular groove on the inner end of the port means 51 in body B, thus enabling the inflating fluid to discharge to the well bore as represented by the arrows 51c whereupon the reinforced inflatable element 37 resumes its initial position and the cooperating latch means on the lower end of 37b of the element 37 and the body B are engaged in a manner as previously described so that normal drilling operations may resume.

In FIG. 5 the tool 30 is similar to that previously described and it is shown as connected into a drill string S in a manner previously described. In this arrangement, however, it will be noted that a spring loaded one way check valve 80 is employed immediately above the drill bit 34, such one way check valve being of a well known construction and forming no part of the present invention. During normal drilling operations, as drilling fluid is pumped down through the drill string, the spring loaded check valve is forced to the open position as shown in FIG. 5 of the drawings.

FIG. 6 shows the form of closure means that is employed when a check valve 80 is used in the drill string such closure means being represented generally by the numeral 90. The closure 90 includes an elongated tube 90a which extends through the bore 31 in the body B and projects beneath the check valve 80 as shown in FIG. 6. The hollow tube 90a thereby retains the check valve 80 in open position and on the upper end of the hollow tube 90a there is formed a hollow housing 90b in which is carried check valve means in the form of the ball 90c which seats at 90d' at the juncture of the upper end of the tube 90a and the lower end of the housing 90b for closing off fluid through the drill string and the bore 31 in the body B. It should be noted that in this form of the invention the spring supported sleeve 42 is provided with an internal groove 42a which terminates short of the upper end of the sleeve 42 thereby providing the inwardly projecting edge 42b. Also, in this form of the invention, the enlarged end portion 43 of sleeve 42 is eliminated, as is the enlarged end 48a on sleeve 48. The upper end of the housing 90b includes an elongated neck 90d on which is slidably carried the fishing neck 92 that fits within the groove 90e formed on the neck 90d, the fishing neck having an inwardly projecting portion 92a which fits within the groove 90e, the limit of travel of the fishing neck 90 being determined by engagement of the projection 92a with the ends of the annular groove 90e for a purpose to be stated.

It will be noted that the fishing neck 92 also includes a skirt 92b which is spaced radially outwardly relative to 90d to provide a space 92c as shown. The skirt 92b is provided with a plurality of circumferentially spaced projections 92d for pivotally supporting the dogs 92e thereon. The dogs 92e extend outwardly through the skirt 92b by means of slots formed therein (not shown) and the annular groove 42a of the sleeve 42 to hold the closure means of the FIG. 6 form of the invention in position within the sleeve 42.

FIG. 7 shows the form of the invention and its closure means as illustrated in FIG. 6 in position when a test of a formation is being conducted. It will be noted that the housing 90b is provided with circumferentially spaced slots 90f at the lower end of the upwardly projecting extension 90d and when a test of the formation is desired, fluid will flow upwardly through the tube 90a and unseat the ball 90c and flow into the neck 90d above the ball 90c and into the drill string as represented by the arrows at 93 in FIG. 7. Of course, at this time, the inflatable element 37 has been inflated by means of pressuring the drill string so that the ball 90c is seated as shown in FIG. 6 to enable the sleeve 42 to be moved down to conduct inflating fluid to the interior of the inflating element 37.

It will be noted that during the flow test, as shown in FIG. 7, the tube 90a has moved up slightly so that the dogs 92e engage the ridge 42b, thus holding the closure means in position during the flow test within the sleeve 42.

When it is desired to unseat the inflatable element 37 after the desired operations within the well bore have been conducted, a closure means such as a go-devil, illustrated at 94 in FIG. 8, is lowered into the well bore to seat on the seat 49b of sleeve 48. Upon increasing the pressure within the drill string, the sleeve 48 is moved down and the passage means 52 again conducts fluid from the interior of the inflatable element through the annular groove 52a in the body B and through the annular recesses 49 to the port means 51 in the body B to the well bore as represented by the arrows 51c.

Prior to the time that the go-devil closure means 94 has been lowered into the drill string S, the closure means 90 shown in FIG. 6 may be first retrieved from the well bore by engaging the fishing neck or go-devil 92 by means well known in the art and pulling up thereon, whereupon the projection 92a moves upwardly within the groove 90e so that the dogs 92e may pivotally retract from the annular recess or groove 42a, and the closure means 90 then withdrawn from the drill string S. In some circumstances, the closure means 94 is inserted, the element deflated and then both go-devils 92 and 94 retrieved. Thereafter, normal drilling operations may be resumed. The other go-devils herein referred to may also be retrieved by wire line means well known in the art. The form of the invention shown in FIGS. 5–12 inclusive will perform all of the methods described herein and the form shown in FIGS. 1–4 will perform the testing method.

The form of the tool shown in FIG. 9 is similar to that previously described with regard to FIGS. 6 through 8 inclusive, and shows the relationship of the components of the invention when it is mounted on the drill string S during normal drilling operations. Also, it will be noted that the sleeve 42 and the sleeve 48 are constructed in the manner as shown with regard to the form of the tool illustrated in FIGS. 6 through 8.

A different form of closure means is employed when the tool is used in the manner as illustrated in FIGS. 10 through 12 inclusive, such closure means being referred to generally by the numeral 100. It includes an annular ring 101 which seats on one end of the recess 42a in sleeve 42 as shown.

The numeral 100 represents a pre-set, pressure opening closure means which includes an elongated stem 102 that extends through the ring 101 and is secured thereto by the shear pin means 103. It will be noted that the stem extends above the ring as shown in the drawings and is provided with circumferentially spaced radial projections 104 which are vertically spaced in relation to the upper edge of ring 101 as shown in FIG. 10 of the drawings. When pressure is increased in the drill string, the pre-set, pressure opening closure means 100 as shown in FIG. 10 moves the sleeve 42 downwardly against the spring 45 which supports it so that the fluid may be conducted through the passage means 40 to the interior of the inflatable element 37 to inflate it to engage it with the well bore wall 18 as shown in FIG. 10 of the drawings. This closes off the well bore below the packer from that portion of the well bore above the packer.

After the packer has been seated, the pressure within the drill string is increased to shear the pin 103 as represented in FIG. 11 of the drawings so that the stem may move downwardly relative to the ring 101 and is supported thereon by the radial projections 104 engaging the top edge of the ring. Since the stem 102 is smaller in diameter adjacent the lugs 104, an annular flow space 105 is formed through the closure means when the lugs rest on the upper edge of ring 101 so that suitable material as represented by the arrows at 106 may be pumped down through the drill string and out through the drill bit into the well bore. After the desired operation has been completed, the fishing neck 107 on the closure means 100 may be engaged and the device retrieved from the drill string whereupon the go-devil as represented at 94 which is similar in construction to the go-devil disclosure described with regard to FIG. 8, is pumped, or dropped, through the drill string to rest on the seat 49b of the sleeve 48 so that the passage means 52 may conduct the fluid from the interior of the inflatable element to the annular groove 52a and then by means of the recesses 49 to the port 51 in the body B to discharge it to the well bore, thereby collapsing the inflatable element 37 to relatch the end 37b with the body B so that normal drilling operations may continue.

In the form of the tool described with regard to FIGS. 9 through 12, it has particular application where it is desired to pump some substance down into the well bore to a formation to accomplish any one of several purposes. For example, in those formations where lost circulation problems are expected, that is where it may be expected that there is some formation which is a "thief" zone, that is, one which takes the drilling fluid from the well bore during normal drilling operations, it may be desirable to seal off such formation by cement or some other lost circulation material. This can be accomplished by using the form of the tool as described with regard to FIGS. 10 through 12 and the material may be pumped down into the well bore and into the formation and after the operation has been completed, the inflatable element can be deflated and normal operations continued.

The pre-set pressure opening closure means 100 utilizes the shear pin 103 to pre-determine its opening pressure. Other means such as a frangible disc, snap ring arrangement, collet action, or other means could be employed.

Where the tool is employed as a test tool, it is run as an integral part of the drill string and enables a particular formation or formations to be tested as the well bore is being drilled. For example, in those formations where water, air or foam or liquid is being used as the drilling fluid, and the pressure of the zone to be tested would exceed the hydrostatic pressure of the drilling fluid, the tool may be set by inflating the packer as described herein. The drill pipe is filled with water, air or nitrogen or some fluid that is lighter than the pressure in the formation to be tested and thereupon the zone is allowed to flow or blow back into the drill string in order that a sample may be collected. After the test has been conducted, the inflatable element may be deflated as described hereinbefore and normal drilling operations continued. Where a closure means in the form of a ball is employed, after the element 37 has been deflated, it may be pumped out by reversing the circulation, that is, by pumping down the well bore and into the drill bit 34 and then upwardly through the bore 31 to pump the ball closure means out of the drill string.

In some situations gas pockets are encountered during drilling operations and the present tool could be set and would permit the gas pocket to be bled off through the drill string whereupon normal drilling operations could then resume.

The tool could be used in a method to determine the disposal characteristics of a formation. For example, in such operations the form of the tool as described in FIGS. 10 through 12 would be employed and the pumping pressure for various flow rates with desired fluid into the formation could be determined, which would in turn indicate the characteristic of the formation as a disposal zone, thereupon the material to be pumped into the waste disposal zone could be pumped down the drill string, and into the formation. Similarly, the same operation could be used for repressuring a formation by gas, or using a formation for gas storage, or other suitable fluid storage, or the same operation could be used for a water flooding operation. Also, a similar operation could be used for charging a formation for subsidence control.

Additionally, the tool could be employed to carry out cementing operations in a well bore to isolate one or more formations encountered during drilling.

In some instances, it is desirable, or necessary to reduce the density of the fluid in the drill string to obtain a pressure at the drill bit which is less than the pressure of the formation being tested in order to allow the flow from the formation to come in through the bit and into the well string. This may be done, where weighted drilling liquid is used as the drilling fluid, by pumping water or nitrogen into the drill string to displace the weighted drilling fluid. The element could then be set and the pre-set pressure opening closure 100 actuated to allow the formation sample to flow in. Another way to lighten the weighted drilling liquid would be to first inflate the element and seal it against the well bore wall. Chemicals could then be placed in the drill pipe to blow the drill mud out of the pipe or aerate the mud column and thereby permit formation fluids to flow into the drill pipe.

It should be noted also that the sleeve 42 is provided with an opening 105 in order that fluid pressure may escape from the counterbore 46 in which the spring means 45 is mounted.

The foregoing disclosure and description of the invention are illustrative and explanatory thereof and various changes in size, shape, and materials, as well as in the details of the illustrated construction, may be made within the scope of the appended claims without departing from the spirit of the invention.

What is claimed is:

1. A method of testing a well formation encountered during drilling a well bore with a drill string having a reinforced inflatable element carried on a tubular body supported by the string, there being a bit means on the lower end of the string, comprising the steps of:
   (a) dropping closure means through the drill string and into the body;
   (b) conducting fluid from the drill string to the interior of the inflatable element to inflate it and sealingly engage it with the surrounding well bore; and
   (c) flowing fluid from the formation to be tested through the bit means and the drill string above the closure means to collect a sample of the formation fluid.

2. A method of sealing off a well formation encountered during drilling a well bore with a drill string having a reinforced inflatable element carried on a tubular body supported by the string, there being a bit means on the lower end of the string, comprising the steps of:
   (a) positioning in the body pre-set pressure opening closure means;
   (b) conducting fluid from the drill string to the interior of the inflatable element to inflate it and sealingly engage it with the surrounding well bore;
   (c) applying additional fluid pressure in the drill string to open the closure means and thereby open the drill string to the well bore through the bit means; and
   (d) pumping material of desired constituents through the string and out through the bit means into the well bore to seal off a formation therein.

3. A method of treating a well formation encountered during drilling a well bore with a drill string having a reinforced inflatable element carried on a tubular body supported by the string, there being a bit means on the lower end of the string, comprising the steps of:
   (a) positioning in the body pre-set pressure opening closure means;
   (b) conducting fluid from the drill string to the interior of the inflatable element to inflate it and sealingly engage it with the surrounding well bore;
   (c) applying additional fluid pressure in the drill string to open the closure means and thereby open the drill string to the well bore through the bit means; and
   (d) pumping material through the string and out through the bit means into the well bore to treat a formation therein.

4. A method of testing a well formation encountered during drilling a well bore with a drill string having a reinforced inflatable element carried on a tubular body supported by the string, there being a bit means on the lower end of the string, comprising the steps of:
   (a) positioning in the body a pre-set pressure opening closure means;
   (b) conducting fluid from the drill string to the interior of the inflatable element to inflate it and sealingly engage it with the surrounding well bore;
   (c) applying additional fluid pressure in the drill string to open the closure means and thereby open the drill string to the well bore through the bit means; and
   (d) flowing fluid through the string and out through the bit means into the formation and measuring the flow rate of the fluid as a characteristic of the formation being tested.

5. A method of testing a well formation encountered during drilling a well bore with a drill string having a reinforced inflatable element carried on a tubular body supported by the string, there being a bit means on the lower end of the string, comprising the steps of:
   (a) positioning closure means in the body;
   (b) conducting fluid from the drill string to the interior of the inflatable element to inflate it and sealingly engage it with the surrounding well bore;
   (c) flowing fluid from the formation to be tested through the bit means and into the drill string to collect a sample of the formation fluid;
   (d) positioning additional closure means in the body so that fluid pressure in the drill string may then communicate the interior of the inflatable element through passage means in the body with the well bore whereby the inflatable element may be deflated to enable further drilling in the well bore; and
   (e) removing all closure means from the body.

6. A method of sealing off a well formation encountered during drilling a well bore with a drill string having a reinforced inflatable element carried on a tubular body supported by the string, there being a bit means on the lower end of the string, comprising the steps of:
   (a) positioning in the body pre-set pressure opening closure means;
   (d) conducting fluid from the drill string to the interior of the inflatable element to inflate it and sealingly engage it with the surrounding well bore;
   (c) applying additional fluid pressure in the drill string to open the closure means and thereby open the drill string to the well bore through the bit means;
   (d) pumping material of desired constituents through the string and out through the bit means into the well bore to seal off a formation therein;

(e) positioning additional closure means in the body so that fluid pressure in the drill string may then communicate the interior of the inflatable element through passage means in the body with the well bore whereby the inflatable element may be deflated to enable further drilling in the well bore; and (f) removing all closure means from the body.

7. A method of treating a well formation encountered during drilling a well bore with a drill string having a reinforced inflatable element carried on a tubular body supported by the string, there being a bit means on the lower end of the string comprising the steps of:

(a) positioning in the body pre-set pressure opening closure means;

(b) conducting fluid from the drill string to the interior of the inflatable element to inflate it and sealingly engage it with the surrounding well bore;

(c) applying additional fluid pressure in the drill string to open the closure means and thereby open the drill string to the well bore through the bit means;

(d) pumping material through the string and out through the bit means into the well bore to treat a formation therein;

(e) positioning additional closure means in the body so that fluid pressure in the drill string may then communicate the interior of the inflatable element through passage means in the body with the well bore whereby the inflatable element may be deflated to enable further drilling in the well bore; and (f) removing the closure means from the body.

8. A method of testing a well formation encountered during drilling a well bore with a drill string having a reinforced inflatable element carried on a tubular body supported by the string, there being a bit means on the lower end of the string, comprising the steps of:

(a) positioning in the body a pre-set pressure opening closure means;

(b) conducting fluid from the drill string to the interior of the inflatable element to inflate it and sealingly engage it with the surrounding well bore;

(c) applying additional fluid pressure in the drill string to open the closure means and thereby open the drill string to the well bore through the bit means;

(d) flowing fluid through the string and out through the bit means into the formation and measuring the flow rate of the fluid as a characteristic of the formation being tested; and (e) removing the closure means from the body.

9. A method of testing a well formation encountered during drilling a well bore with a drill string that carries a reinforced inflating element secured thereto at one of its ends with the other end of the element movable therealong and bit means on the lower end of the string, comprising the steps of:

(a) positioning latch means between the drill string and the movable element end for normally retaining the element in deflated position during drilling operations, but releasable upon inflation of the element, the latch means reengaging the movable element end and drill string upon deflation of the element;

(b) positioning closure means in the drill string;

(c) conducting fluid from the drill string to the interior of the inflatable element to inflate it and sealingly engage it with the surrounding well bore; and (d) flowing fluid from the formation to be tested through the bit means and the drill string above the closure means to collect a sample of the formation fluid.

10. A method of sealing off a well formation encountered during drilling a well bore with a drill string that carries a reinforced inflatable element secured thereto at one of its ends with the other end of the element movable therealong and bit means on the lower end of the string, comprising the steps of:

(a) positioning latch means between the drill string and the movable element end for normally retaining the element in deflated position during drilling operations, but releasable upon inflation of the element, the latch means reengaging the movable element end and drill string upon deflation of the element;

(b) positioning closure means in the drill string;

(c) conducting fluid from the drill string to the interior of the inflatable element to inflate it and sealingly engage it with the surrounding well bore;

(d) applying additional fluid pressure in the drill string to open the closure means and thereby open the drill string to the well bore through the bit means; and (e) pumping material of desired constituents through the string and out through the bit means into the well bore to seal off a formation therein.

11. A method of treating a well formation encountered during drilling a well bore with a drill string that carries a reinforced inflatable element secured thereto at one of its ends with the other end of the element movable therealong and bit means on the lower end of the string, comprising the steps of:

(a) positioning latch means between the drill string and the movable element end for normally retaining the element in deflated position during drilling operations, but releasable upon inflation of the element, the latch means reengaging the movable element end and drill string upon deflation of the element;

(b) positioning closure means in the drill string;

(c) conducting fluid from the drill string to the interior of the inflatable element to inflate it and sealingly engage it with the surrounding well bore;

(d) applying additional fluid pressure in the drill string to open the closure means and thereby open the drill string to the well bore through the bit means; and (e) pumping material through the string and out through the bit means into the well bore to treat a formation therein.

12. A method of testing a well formation encountered during drilling a well bore with a drill string that carries a reinforced inflatable element secured thereto at one of its ends with the other end movable therealong and bit means on the lower end of the string, comprising the steps of:

(a) positioning latch means between the drill string and the movable element end for normally retaining the element in deflated position during drilling operations, but releasable upon inflation of the element, the latch means reengaging the movable element end and drill string upon deflation of the element;

(b) positioning in the drill string a pre-set pressure opening closure means;

(c) conducting fluid from the drill string to the interior of the inflatable element to inflate it and sealingly engage it with the surrounding well bore;

(d) applying additional fluid pressure in the drill string to open the closure means and thereby open the drill string to the well bore through the bit means; and (e) flowing fluid through the string and out through the bit means into the formation and measuring the flow rate of the fluid as a characteristic of the formation being tested.

13. A method of cementing a well formation encountered during drilling a well bore with a drill string that carries a reinforced inflatable element secured thereto at one of its ends with the other end movable therealong and bit means on the lower end of the string, comprising the steps of:

(a) positioning in the drill string pre-set pressure opening closure means;

(b) conducting fluid from the drill string to the interior of the inflatable element to inflate it and sealingly engage it with the surrounding well bore;

(c) applying additional fluid pressure in the drill string to open the closure means and thereby open the drill string to the well bore through the bit means; and (d) pumping material of desired construents through the string and out through the bit means into the well bore to cement off a formation therein.

14. A method of operating a reinforced inflatable element in a well bore comprising the steps of:

(a) positioning the reinforced inflatable element on the well string with one end of the element secured to the well string and the other end of the element movable thereon;

(b) securing latch means between the movable end of the element and the well string for normally retaining the inflatable element in deflated position in the well bore;

(c) positioning closure means in the well string; and (d) conducting fluid from the well string to the interior of the inflatable element to inflate the element, release the latch means so as to accommodate relative longitudinal movement between the movable end of the inflatable element and the well string and to inflate and sealingly engage the inflatable element with the surrounding well bore.

15. A method of cementing a well formation encountered during drilling a well bore with a drill string that carries a reinforced inflatable element secured thereto at one of its ends with the other end of the element movable therealong and bit means on the lower end of the string, comprising the steps of:

(a) positioning latch means between the drill string and the movable element end for normally retaining the element in deflated position during drilling operations, but releasable upon inflation of the element, the latch means reenegaging the movable element end and drill string upon deflation of the element;

(b) positioning closure means in the drill string;

(c) conducting fluid from the drill string to the interior of the inflatable element to inflat it and sealingly engage it with the surrounding well bore;

(d) applying additional fluid pressure in the drill string to open the closure means and thereby open the drill string to the well bore through the bit means; and (e) pumping material of desired constituents through the string and out through the bit means into the well bore to cement off a formation therein.

16. A method of testing a well formation encountered during drilling a well bore with a drill string that causes a reinforced inflatable element secured thereto at one of its ends with the other end of the element movable therealong and bit means on the lower end of the string comprising the steps of:

(a) dropping in the drill string a pre-set pressure opening closure means;

(b) conducting fluid from the drill string ot the interior of the inflatable eleemnt to inflate it and sealingly engage it with the surrounding well bore;

(c) applying additional fluid pressure in the drill string to open the closure means and thereby open the drill string to the well bore through the bit means; and (d) flowing fluid from the formation to be tested through the bit means and the drill string above the closure means to collect a sample of the formation fluid.

17. A method of testing a well formation encountered during drilling a well bore with a drill string having a reinforced inflatable element carried on a tubular body supported by the string, there being a bit means on the lower end of the string, comprising the steps of:

(a) positioning in the body a pre-set pressure opening closure means;

(b) conducting fluid from the drill string to the interior of the inflatable element to inflat it and sealingly engage it with the surrounding well bore;

(c) applying additional fluid pressure in the drill string to open the closure means and thereby open the drill string to the well bore through the bit means;

(d) flowing fluid through the string and out through the bit means into the formation and measuring the flow rate of the fluid as a characteristic of the formation being tested; and (e) removing the closure means form the body.

18. A method of testing a well formation encountered during drilling a well bore with a drill string that carries a reinforced inflatable element secured thereto at one of its ends with the other end of the element movable therealong and bit means on the lower end of the string, comprising the steps of:

(a) positioning latch means between the drill string and the movable element end for normally retaining the element in deflated position during drilling operations, but releasable upon inflation of the element, the latch means reengaging the movable element end and drill string upon deflation of the element;

(b) positioning in the drill string a pre-set pressure opening closure means;

(c) conducting fluid from the drill string to the interior of the inflatable element to inflate and sealingly engage it with surrounding well bore;

(d) applying additional fluid pressure in the drill string to open te closure means and thereby open the drill string to the well bore through the bit means;

(e) flowing fluid from the formation to be tested through the bit means and into the drill string to collect a sample of the formation fluid;

(f) positioning additional closure means in the body whereby fluid pressure in the drill string communicates the interior of the inflatable element through passage means in the body with the well bore whereby the inflatable element may be deflated to enable further drilling in the well bore; and (g) removing the closure means from the body.

19. The method of claim 1 including the step of decreasing the pressure in the drill string to encourage the formation to be tested to flow into the drill string.

20. The method of claim 5 including the step of decreasing the pressure in the drill string to encourage the formation to be tested to flow into the drill string.

21. The method of claim 9 including the step of decreasing the pressure in the drill string to encourage the formation to be tested to flow into the drill string.

22. The method of claim 16 including the step of decreasing the pressure in the drill string to encourage the formation to be tested to flow into the drill string.

23. The method of claim 18 including the step of decreasing the pressure in the drill string to encourage the formation to be tested to flow into the drill string.

24. The method of claim 1 including the step of positioning additional closure means in the body whereby fluid pressure in the drill string communicates the interior of the inflatable element through passage means in the body with the well bore whereby the inflatable element may be deflated to enable further drilling in the well bore.

25. The method of claim 2 including the step of positioning additional closure means in the body to communicate the interior of the inflatable element through passage means in the body with the well bore whereby the inflatable element may be deflated to enable further drilling in the well bore.

26. The method of claim 3 including the step of positioning additional closure means in the body whereby fluid pressure in the drill string communicates the interior of the inflatable element through passage means in the body with the well bore whereby the inflatable element may be deflated to enable further drilling in the well bore.

27. The method of claim 9 including the step of positioning additional closure means in the body whereby fluid pressure in the drill string communicates the interior of the inflatable element through passage means in the body with the well bore whereby the inflatable element may be deflated to enable further drilling in the well bore.

28. The method of claim 10 including the step of positioning additional closure means in the body to communicate the interior of the inflatable element through passage means in the body with the well bore whereby the inflatable element may be deflated to enable further drilling in the well bore.

29. The method of claim 11 including the step of positioning additional closure means in the body whereby fluid pressure in the drill string communicates the interior of the inflatable element through passage means in the body with the well bore whereby the inflatable element may be deflated to enable further drilling in the well bore.

30. The method of claim 13 including the step of positioning additional closure means in the body to communicate the interior of the inflatable element through passage means in the body with the well bore whereby the inflatable element may be deflated to enable further drilling in the well bore.

31. The method of claim 15 including the step of positioning additional closure means in the body whereby fluid pressure in the drill string communicates the interior of the inflatable element through passage means in the body with the well bore whereby the inflatable element may be deflated to enable further drilling in the well bore.

32. The method of operating a reinforced inflatable element in a well bore comprising the steps of:
(a) positioning the reinforced inflatable element on the well string with one end of the element secured to the well string and the other end of the element movable thereon;
(b) securing latch means between the movable end of the element and the well string for normally retaining the inflatable element in deflated position in the well bore;
(c) positioning in the well string pre-set pressure opening closure means;
(d) conducting fluid from the well string to the interior of the inflatable element to inflate the element, release the latch means so as to accommodate relative longitudinal movement between the movable end of the inflatable element and the well string and to inflate and sealingly engage the inflatable element with the surrounding well bore; and
(e) applying additional fluid pressure in the well string to open the closure means and thereby open the well string to the well bore.

References Cited
UNITED STATES PATENTS

| | | | |
|---|---|---|---|
| 2,404,825 | 7/1946 | Brown et al. | 166—142 X |
| 2,831,541 | 4/1958 | Conover | 166—147 |
| 2,836,246 | 5/1958 | Hoch | 166—264 |
| 2,978,046 | 4/1961 | True | 166—162 X |
| 3,111,169 | 11/1963 | Hyde | 166—145 |
| 3,327,781 | 6/1967 | Nutter | 166—264 X |

JAMES A. LEPPINK, Primary Examiner

U.S. Cl. X.R.

166—147, 187

PO-1050
(5/69)

UNITED STATES PATENT OFFICE
CERTIFICATE OF CORRECTION

Patent No. 3,529,665    Dated September 22, 1970

Inventor(s)  Billy C. Malone

It is certified that error appears in the above-identified patent and that said Letters Patent are hereby corrected as shown below:

Column 5, line 27, change "371" to --37g--.
Column 14, line 30, change "te" to --the--.

SIGNED AND
SEALED
DEC 8 - 1970

(SEAL)
Attest:

Edward M. Fletcher, Jr.
Attesting Officer

WILLIAM E. SCHUYLER, JR.
Commissioner of Patents